May 31, 1938.  W. C. SCOTT  2,119,247
SPEED CONTROL SYSTEM
Filed Jan. 23, 1936  3 Sheets-Sheet 1
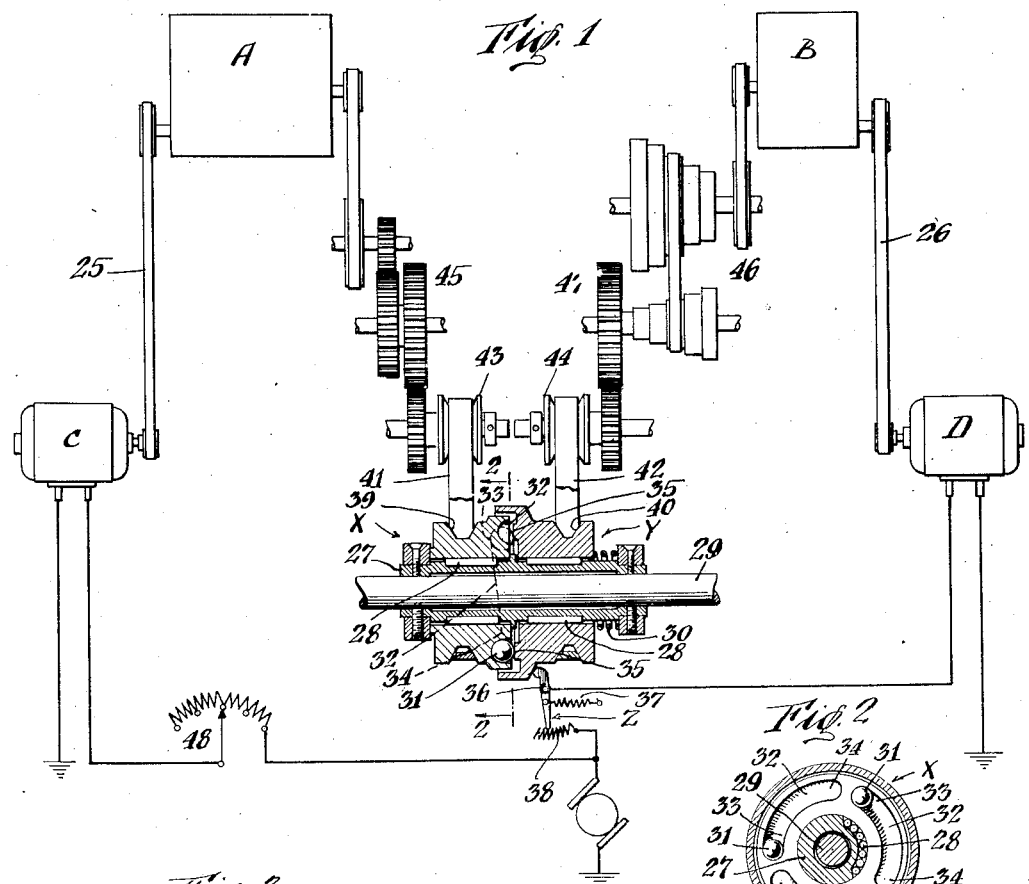
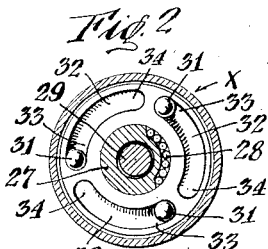
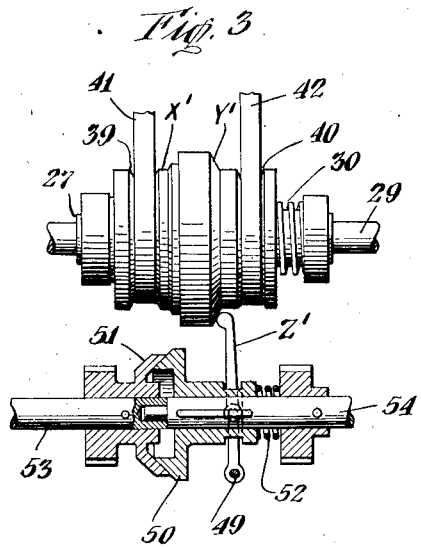
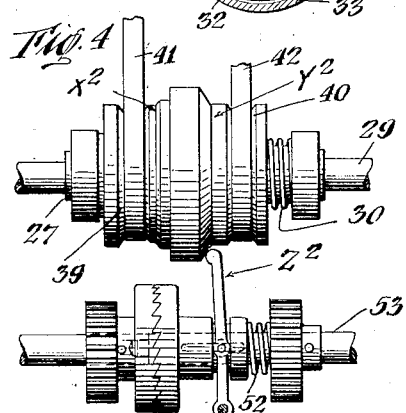
INVENTOR
Walter C. Scott
BY
ATTORNEY

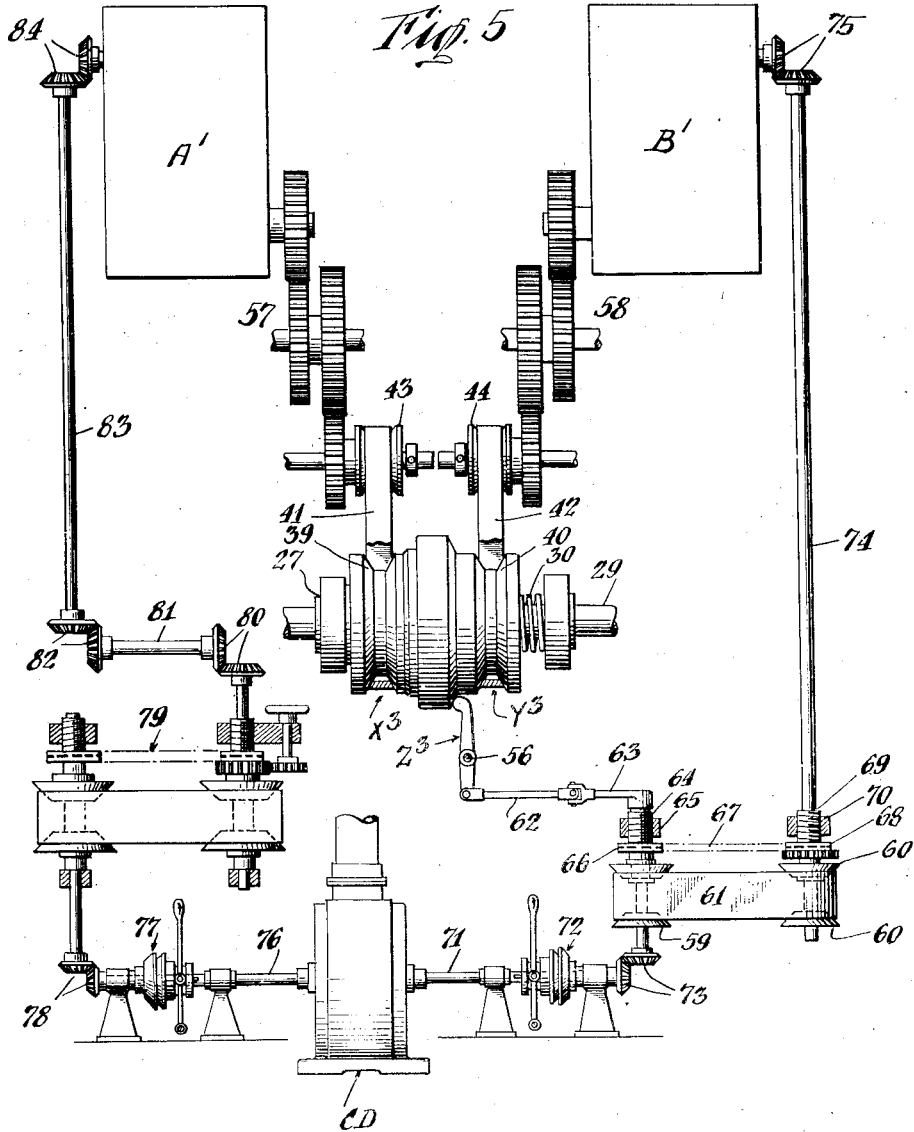

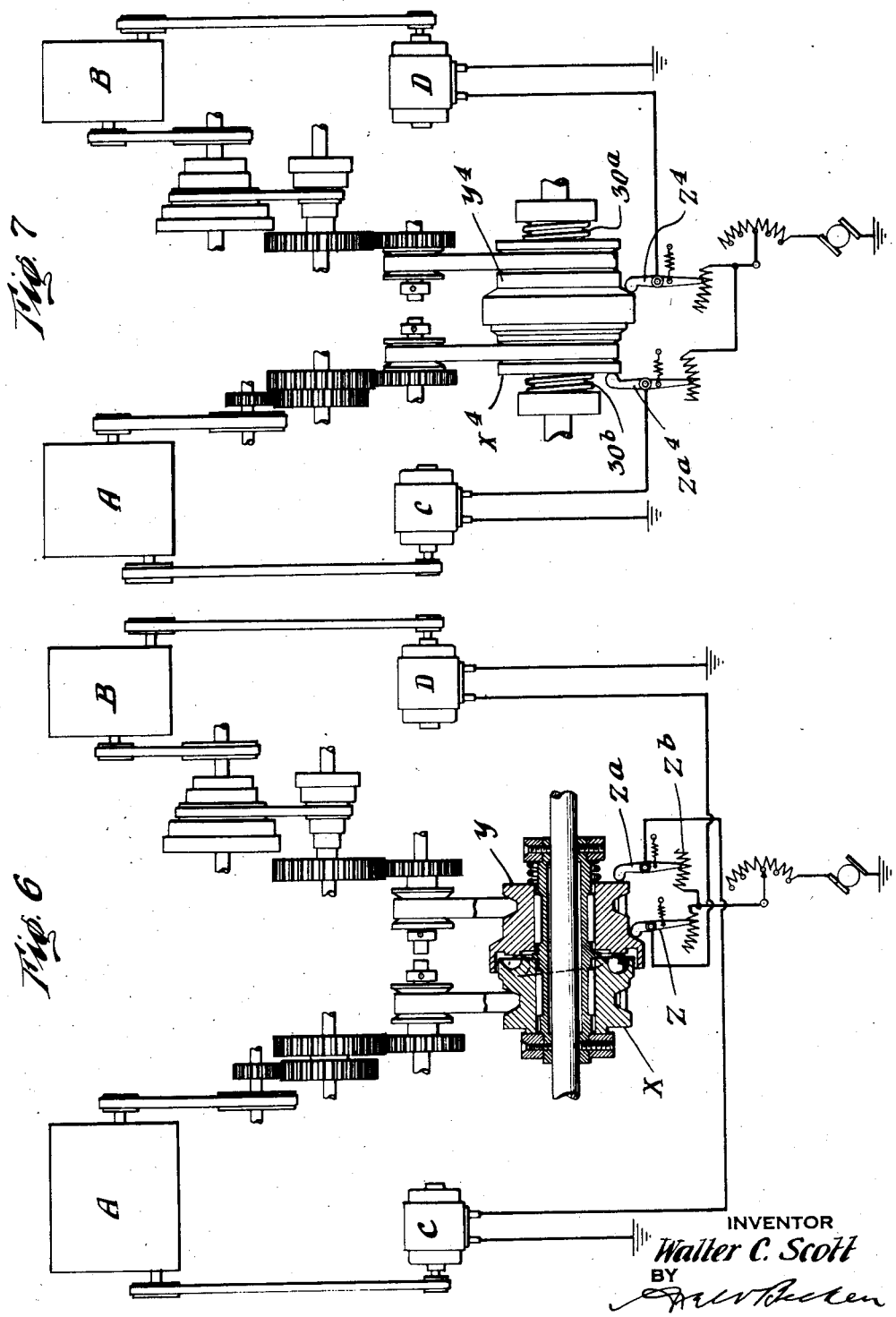

Patented May 31, 1938

2,119,247

UNITED STATES PATENT OFFICE 2,119,247

SPEED CONTROL SYSTEM

Walter C. Scott, Plainfield, N. J.

Application January 23, 1936, Serial No. 60,423

13 Claims. (Cl. 74—395)

This invention relates generally to a speed control system capable of being used widely in the arts, and has for its main object and feature to obtain a desired relative speed between associated but separately driven units, or devices.

In the accompanying drawings the invention is disclosed in a number of forms, in which Fig. 1 is a diagrammatic view with parts broken away and in section disclosing one embodiment of the invention, with the control mechanism shown on an enlarged scale for the sake of clearness;

Fig. 2 is a vertical sectional view substantially on the plane of line 2—2 of Fig. 1;

Figs. 3 and 4 are detail views showing modified forms of the control mechanism;

Fig. 5 is a diagrammatic view similar to Fig. 1 showing an all mechanical drive with the control mechanism also shown on an enlarged scale for the sake of clearness;

Fig. 6 is a view similar to Fig. 1 but shows the use of two control elements; and Fig. 7 is a view similar to Fig. 6 showing a modified form of the invention.

Referring first to Fig. 1, A and B indicate two units or devices. For the sake of convenience, A will be referred to as a "primary device", and B will be designated by the term "secondary device". The primary device is driven from motor C, and the secondary device from motor D, by transmission means here indicated by conventional belts and pulleys 25 and 26. The problem involved is to obtain, with respect to the speed of one device, such as A, a desired relative speed of another device, such as B or vice versa. The solution of the problem is accomplished by providing control mechanism or a speed coordinator consisting in part of two control members X and Y, that rotate independently in the same direction at the same or at different speeds. One, X, is driven proportional to the speed of primary device A, and the other, Y, is driven proportional to the speed of secondary device B, but in such a way that the two control members X and Y run at equal speed when the desired relative speed is attained between the primary and secondary devices A and B, and the speed of one of said devices, here secondary device B, is controlled by variations in the speed relation of the two control members X and Y. The expression "desired relative speed" is not intended to indicate that A and B must run at the same speed; on the contrary the desired relative speed of secondary device B with respect to primary device A may not only be equal but can be in the proportion of one to two or in any other proportion that may be desired depending upon the gear or transmission ratio used. Again, variable-speed transmission mechanism can be employed between one of the devices and the control member driven by it so that it is possible to establish another or different desired relative speed between the primary and secondary devices. The expression "proportional to the speed of" used in connection with the control members is not intended to mean that said control members run at the same speed or rate of revolution per minute as the primary and secondary devices. Manifestly the two control members may run faster or slower than, or at the same speed as, the primary and secondary devices. But if devices A and B run at a relatively slow speed, control members X and Y may, by reason of multiplying gearing or transmission means, make many thousands of revolutions per minute so that even a slight variation in speed between devices A and B, from the relative speed which is desired, will be magnified or amplified to an enormous extent and can therefore readily be detected by the control members by reason of a consequent substantial variation in speed between them.

The control mechanism or speed coordinator, which is shown on an exaggerated scale for the sake of clearness, may take many forms. In the instant form here disclosed, it consists of the two control members X and Y, together with certain other means to be presently described. Members X and Y are mounted, side by side in coaxial relation, to rotate independently of each other on sleeve 27 by means of needle roller bearings 28. As will be seen, said members X and Y are "gearless" that is to say they have no intermeshing toothed gears or screw members. Sleeve 27 is fixed to shaft 29. Said members X and Y are capable of being brought closer together or further apart, and in the present instance this is accomplished by mounting member Y slidable lengthwise on sleeve 27. A spring 30 tends to urge member Y toward member X, and floating means controlled by variations in speed between the two members are employed to counteract the spring to thereby cause a sliding movement of member Y, which sliding movement, whether in one direction or the other, is translated to exert a controlling influence on the speed of secondary device B. The floating means referred to consists of a number of balls 31 that are interposed between the adjacent faces of the two control members, one of said members, here X, being provided in the face adjacent the other member with a series of circumferentially extending segmental-shape grooves 32, each groove being of taper formation, that is, deeper at one end 33 and gradually becoming shallower toward end 34, and the other member, here Y, being provided, on the face adjacent the first member, with a continuous surface 35. It will now be understood that when members X and Y are rotated in the same direction, balls 31 will remain in the deep ends of the grooves so long as the speed of Y does not exceed that of X, but that, when the speed of Y exceeds that of X, balls 31 will travel toward the shallow end of the grooves and will therefore cause a sliding movement of control member Y away from control member X, and that if thereafter the speed of control member Y decreases to that of control member X or falls below it, balls 31 will move toward the deep ends of the grooves and spring 30 will cause a return sliding movement of member Y toward X. The sliding movement of control member Y can be utilized in many different ways to control the speed of secondary device B either by varying the amount of power flowing to B or by cutting off or supplying power, as the case may be. In the present exemplification, a control element Z is pivotally supported at 36 and is held against member Y by means of a pull-spring 37. Element Z here forms the movable part of a rheostat 38 by means of which power supplied to motor D is controlled to either accelerate or decelerate the speed thereof and consequently the speed of secondary device B and of control member Y. The movement of control element Z is here of such amplitude that the sliding movement of Y away from X will at first decrease the amount of current supplied to motor D and will finally cut off power altogether. The means for imparting motion to primary and secondary control members X and Y may take many forms. As shown here, each of said members is provided with a belt groove 39 or 40 in which are located belts 41 and 42 driven from independently driven pulleys 43 and 44. Pulley 43 is driven by suitable multiplying transmission means from primary device A, such means here consisting of pulleys, belt and gears 45. Pulley 44 is driven by suitable multiplying transmission means, here including variable speed cones 46 and gears 47. The gear or transmission ratio shown here is such that, while primary device A makes two revolutions, secondary device B will make one revolution, but it will be understood that, by shifting the belt between cones 46, a different relative speed between A and B can be established.

The operation of the equipment shown in Figs. 1 and 2 is apparent from the description already given, but may be summarized as follows: current is applied to motors C and D thereby energizing them and operating primary and secondary devices A and B which in turn drive the primary and secondary control members X and Y. So long as the speed of control member Y does not exceed that of control member X, said two control members remain neutral with respect to each other and motor D will continue to accelerate, but the moment the speed of member Y exceeds that of X, said member Y is moved lengthwise by the camming action of the balls and taper grooves thereby decreasing the speed of motor D, or cutting off current altogether thereby allowing it to run under its own momentum, until the speed of Y is decelerated until it falls below or equals that of X, when power is again applied. Thus it will be seen that the coordinator exerts, throughout a range of speeds, a controlling influence of one character when one of its control members, here X, runs above the speed of the other as well as when the two control members run at the same speed, and exerts a different controlling influence when said other control member, here Y, exceeds the speed of the first-mentioned one. It will further be understood that when the speed of motor C is increased as by means of rheostat 48 or by reason of its own acceleration, the consequent increase in speed of control member X will permit motor D also to continue its acceleration because control member Y will continue to remain neutral with respect to X until member Y moves faster than member X. When motor C is slowed down or stops the reverse action will take place.

From what has been said above, it will be apparent that, the speed of one device is controlled by causing, in response to the speed of another device, a slight fluctuation in speed of the first-mentioned device above and below that desired, and that this fluctuation can be within such narrow range as to result in what amounts to a substantially constant speed. It is, of course, possible that this fluctuation may more or less by chance bring about absolute synchronism, so that no further fluctuation will occur, but even if the element of unpredictability operates adversely it will operate within such close limits that it may be disregarded.

It will also be understood that the terms primary and secondary devices applied to A and B can with equal propriety be applied to motors C and D.

Control element Z need not be in the form of electrical means such as a rheostat or switch. Thus in Fig. 3, control members X' and Y' may actuate a control element Z' pivoted at 49 and connected to one member 50 of a friction clutch, the other member of which is indicated at 51. So long as the speed of control member Y' is not in excess of the speed of control member X', the two clutch members are held in engagement by spring 52 and motion is transmitted from shaft 53, connected to a source of power, to shaft 54 which would drive secondary device B. When the speed of control member Y' exceeds that of control member X', the axial movement of Y', described in connection with Fig. 1, takes place thereby causing control element Z' to lessen the contact of clutch members 50 and 51 or, if the movement is sufficiently extensive, to disengage 50 and 51, thus diminishing the motion of shaft 54 or cutting off power altogether. When the speed of Y' falls to that of X' or below it, clutch members 50 and 51 are again engaged and motion is again transmitted to shaft 54 and secondary device B.

In Fig. 4 is shown substantially the same arrangement, except that control members X2 and Y2 actuate a control element Z2 connected to one member 55 of a toothed clutch. The operation here would be practically the same as that which takes place in the arrangement shown in Fig. 3.

In Fig. 5 an all-mechanical control system is shown in which A' indicates the primary device and B' the secondary device. CD is a turbine driving both A' and B'. X3 and Y3 indicate the two control members actuating a control element Z3 pivoted at 56. Suitable multiplying gearing indicated at 57 and 58 connect devices A' and B' with the two control members, and it will be apparent that variable-speed means such as cones 46 of Fig. 1 can be interposed in gearing 58 of Fig. 5 to vary the desired relative speed of B' to A'. Devices A' and B' are driven separately from turbine CD by any suitable means such as the gearing shown in Fig. 5. In order to vary the speed of device B' in response to the action of control members X3 and Y3 there is interposed a variable-speed mechanism in the transmission between turbine CD and secondary B'. As here shown, it consists of the well-known Reeves drive which includes two sets of adjustable cone pulleys 59 and 60 and a connecting belt 61, together with means for causing the pulleys of one set to approach each other and at the same time causing the pulleys of the other set to be moved farther apart. Control element Z3 is provided with a link 62 pivotally connected to arm 63 of threaded member 64 in engagement with stationary and internally threaded sleeve 65. It will be observed that the movement of control element Z3 in response to the action of Y3 is translated into a turning movement of member 64 thereby causing the latter to move endwise within sleeve 65. One of the pulleys 59 is connected to slide axially in response to the adjusting movement of 64 but to rotate independently thereof. A sprocket 66 is connected to rotate with member 64 and to transmit motion by chain 67 to a sprocket 68 mounted to rotate with a threaded member 69 associated with one of pulleys 60 and to slide one of said pulleys in the opposite direction from the movement imparted to pulley 59. Member 69 is threaded the reverse of member 64 and engages a stationary and internally threaded member 70. The drive from turbine CD to device B' is by way of shaft 71, clutch 72, bevel gears 73, pulleys 59, belt 61, pulley 60, shaft 74 (rotating independently of 69) and bevel gears 75. The drive from turbine CD to device A' is by way of shaft 76, clutch 77, bevel gears 78, a variable-speed device 79 (that is adjustable by hand or otherwise to vary the speed of device A') bevel gears 80, shaft 81, bevel gears 82, shaft 83 and bevel gears 84. The operation of the equipment of Fig. 5 is the same as that described in connection with Fig. 1, except that the control is wholly mechanical instead of partly electrical.

In the foregoing description of the examples of Figs. 1 to 5, and in the description of the modifications which follows, it has been assumed that the rotation of the two control members X and Y is in such direction that the shallow end 34 of grooves 32 of member X is leading and the deep end 33 is trailing. It will, however, be understood that members X and Y could just as well be rotated in the opposite direction, and the action of control element Z be reversed to correspond therewith.

It will be understood that with the invention herein disclosed it is possible not merely to control the speed of one device, but that it is also possible to control the speed of both devices. In Fig. 6 is shown the same arrangement of parts as in Fig. 1, but in addition to control element Z there is shown another control element Za. As in Fig. 1, control element Z governs the circuit of motor D and, when control member Y runs faster than X, member Y moves to the right (Fig. 6) and cuts in more resistance in the circuit leading to D thereby decelerating the speed of the latter. It will be observed that the same movement of Y also moves control element Za but in such a way with respect to rheostat member Zb as to cut out resistance to thereby accelerate the speed of motor C. It will also be understood that by omitting control element Z, motor C only would be controlled by the speed coordinator, so that the desired relative speed of the devices would be attained by accelerating the speed of motor C.

In Fig. 7 is shown a slight modification of Fig. 6. Here again, for the sake of simplicity the same arrangement is employed as in Figs. 1 and 6, with this exception that not only is control member Y4 made movable sidewise, but control member X4 is likewise made slidable, two springs 30a and 30b being employed to urge members X4 and Y4 toward each other. Member Y4 controls element Z4 which controls motor D, and member X4 controls element Za4 which controls motor C. When members X4 and Y4 move away from each other motor D will be decelerated and motor C will be accelerated as will be obvious, and when said members move in the other direction the reverse effect will take place.

I claim:

1. In a system of speed control: two separately driven devices; a speed coordinator including two separately driven rotatable members and intermediate means that permit said members to rotate independently at the same or at different speeds; means to drive one member proportional to the speed of one of said devices and the other member proportional to the speed of the other of said devices and at equal speed when a desired relative speed is attained between the two devices; and means, governed by variations in speed of the two members, to occupy one position when the speed of the two members is equal and to occupy the same position when the speed of one of said members exceeds that of the other, and to occupy another position when the speed of said other member exceeds that of the first-mentioned member, to thereby control the relative speed of the two devices.

2. A control mechanism including: two separately driven members rotatable independently of each other at all times at the same or at different speeds; means for independently driving said members and instrumentalities including a control element whereby said element is governed by the relative speed of said members to occupy one position when the two members rotate at the same speed and to occupy the same position when the speed of one of said members exceeds that of the other, and to occupy another position when the speed of said other member exceeds that of the first-mentioned member.

3. A control mechanism including: two axially alined rotatable members either one of which may exceed the speed of that of the other, one of said members being provided with a series of circumferentially extending arc-shaped taper grooves in the surface which is adjacent the other member, and said other member being provided with a uniform surface adjacent the first-mentioned member; separate means to at all times drive said members independently one of the other in the same direction; balls in said taper grooves engaging the uniform surface aforesaid; and means to urge at least one of said members toward the other.

4. In a system of speed control, two separately driven devices; two independently rotatable control members rotatable in the same direction and at least one of which is capable of an endwise movement with respect to the other; means to drive one of said control members proportional to the speed of one device; means to drive the other of said control members proportional to the speed of the other device; means to maintain said control members in predetermined relative relationship in one direction endwise effective only so long as the speed of the two control members is equal or the speed of one of said control members exceeds that of the other; means to urge said control members, one with respect to the other, in the other direction endwise effective only so long as the speed of said other control member exceeds that of the first-mentioned control member; and means to utilize said relative endwise movement of the control members to control the relative speed of the two devices.

5. A control mechanism including: two axially alined and gearless members rotatable independently of each other in the same direction; separate means to drive said members independently of each other at all times; and instrumentalities including a control element whereby said element is governed by said members to occupy one position when one of said members passes ahead of the other, and to occupy a different position when the other member passes ahead of the first-mentioned member.

6. A control mechanism including: two axially alined and gearless members rotatable independently of each other in the same direction; separate means to drive said members independently of each other at all times; and instrumentalities including a control element whereby said element is governed by said members to occupy one position when one of said members passes ahead of the other as well as when neither member passes ahead of another, and to occupy a different position when the other member passes ahead of the first-mentioned member.

7. A control mechanism including: two rotatable members either one of which may exceed the speed of that of the other; separate means to at all times drive said members independently one of the other in the same direction; and means whereby said members remain neutral with respect to each other so long as the speed of one member is equal to or exceeds that of the other and whereby a relative movement between the members is established when the speed of said other member exceeds that of the first-mentioned member.

8. A control mechanism including: two rotatable and gearless members; separate means to at all times drive said members independently of each other in the same direction; instrumentalities including a control element whereby said element is moved into different positions by said instrumentalities in response to the relative speed of said members; and means to control at least one of the separate drive means by said element.

9. In a system of speed control: two separately driven devices; a speed coordinator including two separately driven rotatable members and intermediate means that permit said members to rotate independently at the same or at different speeds; means to drive one member proportional to the speed of one of said devices and the other member proportional to the speed of the other of said devices and at equal speed when a desired relative speed is attained between the two devices; and means, governed by variations in speed of the two members throughout a range of speeds, to occupy one position when the speed of the two members is equal and to occupy the same position when the speed of one of said members exceeds that of the other, and to occupy another position when the speed of said other member exceeds that of the first-mentioned member, to thereby control the relative speed of the two devices.

10. A control mechanism including: two separately driven members rotatable independently of each other at all times at the same or at different speeds; means for independently driving said members; and instrumentalities including a control element whereby said element is governed throughout a range of speeds by the relative speed of said members to occupy one position when the two members rotate at the same speed and to occupy the same position when the speed of one of said members exceeds that of the other, and to occupy another position when the speed of said other member exceeds that of the first-mentioned member.

11. In a system of speed control, two separately driven devices; two independently rotatable control members rotatable in the same direction and at least one of which is capable of an endwise movement with respect to the other; means to drive one of said control members proportional to the speed of one device; means to drive the other of said control members proportional to the speed of the other device; means to maintain throughout a range of speeds said control members in predetermined relative relationship in one direction endwise effective only so long as the speed of the two control members is equal or the speed of one of said control members exceeds that of the other; means to urge said control members, one with respect to the other, in the other direction endwise effective only so long as the speed of said other control member exceeds that of the first-mentioned control member; and means to utilize said relative endwise movement of the control members to control the relative speed of the two devices.

12. A control mechanism including: two axially alined and gearless members rotatable independently of each other in the same direction; separate means to drive said members independently of each other at all times; and instrumentalities including a control element whereby said element is governed throughout a range of speeds by said members to occupy one position when one of said members passes ahead of the other, and to occupy a different position when the other member passes ahead of the first-mentioned member.

13. A control mechanism including: two axially alined and gearless members rotatable independently of each other in the same direction; separate means to drive said members independently of each other at all times; and instrumentalities including a control element whereby said element is governed throughout a range of speeds by said members to occupy one position when one of said members passes ahead of the other as well as when neither member passes ahead of another, and to occupy a different position when the other member passes ahead of the first-mentioned member.

WALTER C. SCOTT.